United States Patent
MacGougan et al.

(10) Patent No.: US 9,933,527 B2
(45) Date of Patent: *Apr. 3, 2018

(54) DETERMINING LOCATION AND DIRECTION OF TRAVEL USING MAP VECTOR CONSTRAINTS

(71) Applicant: Apple Inc., Cupertino, CA (US)

(72) Inventors: Glenn Donald MacGougan, San Jose, CA (US); Stephen J. Rhee, San Jose, CA (US); Robert Mayor, Half Moon Bay, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,792

(22) Filed: Aug. 29, 2016

(65) Prior Publication Data

US 2017/0052031 A1 Feb. 23, 2017

Related U.S. Application Data

(63) Continuation of application No. 13/913,006, filed on Jun. 7, 2013, now Pat. No. 9,429,437.

(60) Provisional application No. 61/657,695, filed on Jun. 8, 2012.

(51) Int. Cl.
*G06F 17/30* (2006.01)
*G01S 19/42* (2010.01)
*G01C 21/30* (2006.01)
*G01S 19/52* (2010.01)

(52) U.S. Cl.
CPC .............. *G01S 19/42* (2013.01); *G01C 21/30* (2013.01); *G01S 19/52* (2013.01); *G06F 17/30241* (2013.01)

(58) Field of Classification Search
CPC ... G01C 21/30; G06F 17/30241; G01S 19/42; G01S 19/52
USPC ........................................................ 707/748
See application file for complete search history.

(56) References Cited

U.S. PATENT DOCUMENTS

| | | | |
|---|---|---|---|
| 6,356,836 B1* | 3/2002 | Adolph | G01C 21/26 701/410 |
| 6,370,475 B1* | 4/2002 | Breed | B60N 2/2863 340/436 |
| 6,856,898 B1* | 2/2005 | Tompkins | G01C 21/30 340/988 |
| 6,941,220 B2 | 9/2005 | Le et al. | |
| 7,734,410 B2* | 6/2010 | Tooyama | G08G 1/0969 340/995.13 |
| 8,812,014 B2* | 8/2014 | Do | G01S 5/18 370/252 |

(Continued)

OTHER PUBLICATIONS

Thiagarajan, Arvind, "Probabilistic Models for Mobile Phone Trajectory Estimation," Dissertation, Massachusetts Institute of Technology, Submitted to the Department of Electrical Engineering and Computer Science on Sep. 2, 2011, [online] URL: <http://nms.csail.mit.edu/papers/ArvindT.thesis.pdf>, Sep. 2011, 161 pages.

(Continued)

*Primary Examiner* — Phong H Nguyen
(74) *Attorney, Agent, or Firm* — Fish & Richardson P.C.

(57) ABSTRACT

Systems, methods, and computer program products for determining the location and direction of travel of a mobile device using map vector constraints is disclosed.

15 Claims, 8 Drawing Sheets

(56) References Cited

U.S. PATENT DOCUMENTS

| | | |
|---|---|---|
| 9,405,797 B2 | 8/2016 | Edison et al. |
| 9,429,437 B2 | 8/2016 | MacGougan et al. |
| 2002/0128768 A1* | 9/2002 | Nakano ................ G01C 21/32 701/533 |
| 2007/0203638 A1* | 8/2007 | Tooyama ........... G01C 21/3694 701/457 |
| 2007/0219716 A1* | 9/2007 | Shiragami ............. G01C 21/32 701/414 |
| 2009/0149201 A1 | 6/2009 | Ryu et al. |
| 2010/0312472 A1 | 12/2010 | Hilbrandie et al. |
| 2012/0022781 A1* | 1/2012 | Wilson .............. G01C 21/3469 701/410 |
| 2012/0052872 A1* | 3/2012 | Do ........................... G01S 5/18 455/456.1 |
| 2012/0072166 A1 | 3/2012 | Keal et al. |
| 2014/0088867 A1* | 3/2014 | Takaoka ................ G01C 21/16 701/526 |

OTHER PUBLICATIONS

Ristic, B., S. Arulampalam, and N. Gordon (2004). Beyond the Kalman Filter, Particle Filters for Tracking Applications. Artech House. Chapter 3.3, "Resampling," pp. 41-44.

Simon, D. (2006), "Optimal State Estimation, Kalman, H., and Nonlinear Approaches," John Wiley and Sons Inc., pp. 466-469.

\* cited by examiner

DETERMINING LOCATION AND DIRECTION OF TRAVEL USING MAP VECTOR CONSTRAINTS

CROSS-RELATED APPLICATION

This application is a continuation of U.S. patent application Ser. No. 13/913,006, entitled "Determining Location and Direction of Travel Using Map Vector Constraints," filed Jun. 7, 2013, which claims the benefit of priority of U.S. Provisional Application No. 61/657,695, for "Determining Location and Direction of Travel Using Map Vector Constraints," filed Jun. 8, 2012, the entire contents of each of which are incorporated herein by reference.

TECHNICAL FIELD

This disclosure is related generally to navigation systems.

BACKGROUND

Many modern smart phones and other mobile devices (e.g., electronic tablets) include navigation subsystems for allowing a user to track their location or the location of others on a digital map. Satellites, cell towers or network access points (e.g., Wi-Fi) can be used to acquire position data to locate a user on a road in a map database. Using the map database, the navigation system can give directions to other locations along roads also in the map database. Dead reckoning using data from sensors (e.g., accelerometers, gyroscopes) can be used to compute position data when position data is unavailable (e.g., lost satellite signals due to multipath or loss of line of sight).

A map database represents a road network and its associated features. Some examples of features include nodes, links and areas. Each feature can have attributes, such as location coordinates, shape, addresses, road class, speed range, etc. Other information associated with the road network can also be included in the map database, such as points of interest, building shapes, and political boundaries. Map databases can be provided in standardized file formats, such as Geographic Data Files (GDF).

In the map database, each node can represent a point location of the surface of the Earth and can be defined on the a map by a pair of longitude and latitude coordinates. Each link in the map database can represent a stretch of road between two nodes. Links can be represented by a line segment corresponding to a straight section of road or a curve having a shape that can be described by shape points along the link. Curves in the road can be represented by a combination of centroid (point or node), with a radius, and polar coordinates to define the boundaries of the curve. Like nodes, shape points can be defined by longitude and latitude coordinates. Shape points, however, do not connect links. Areas can be two-dimensional shapes that represent things or places, such as parks, cities and blocks. Areas can be defined by boundaries, usually formed by a closed polygon.

SUMMARY

Systems, methods, and computer program products for determining the location and direction of travel of a mobile device using map vector constraints is disclosed. In some implementations, a method comprises: performing particle seeding on a road network surrounding a set of measurements; propagating the particles along the road network; calculating relative particle weights; resampling the particles; computing a particle filter solution; comparing the particle filter solution with an instantaneous matcher; and calculating a map-match given the particles.

Particular implementations disclosed herein provide one or more of the following advantages: 1) activity context is used in a map-matching process to better assess the hypothesis that the mobile device is on the map, to adapt the process used to determine the probability of a specific snap point by potentially favoring direction of travel information when the mobile device is mounted to a vehicle and to adapt the map-matching behavior based on user activity; 2) Wi-Fi locations are fed, when available and appropriate, to a Global Navigation Satellite System (GNSS) receiver as tightly coupled position assistance to improve the ability of the GNSS receiver to reject bad GNSS pseudorange and/or Doppler measurements; and 3) map-matched locations that meet certain acceptability criteria are fed to the GNSS receiver as tightly coupled position assistance to improve the ability of the GNSS receiver to reject bad GNSS pseudorange and/or Doppler measurements.

The details of the disclosed implementations are set forth in the accompanying drawings and the description below. Other features, objects, and advantages will be apparent from the description and drawings, and from the claims.

DESCRIPTION OF DRAWINGS

The same reference symbol used in various drawings indicates like elements.

DETAILED DESCRIPTION

Map Matching Inputs

Map matching includes constraining position and velocity information to a network of road links. A road link can be described by a sequence of linear line segments. Each linear line segment can be a simple vector defined by two sets of coordinates, $(\lambda_1, \varphi_1)$ and $(\lambda_2, \varphi_2)$. Coordinates can be defined with respect to a reference frame (e.g., WGS84

Earth-centered-Earth-fixed (ECEF) reference frame) for convenient use with a GNSS, such as the Global Positioning System (GPS).

GPS Inputs

A typical GPS observation provides the following information:

- φ latitude (degs)
- λ longitude (degs)
- a the semi-major axis (m) of the position uncertainty confidence region at a probability level (e.g., a 39% probability level)
- b the semi-minor axis (m) of the position uncertainty confidence region at a probability level (e.g., a 39% probability level)
- θ the azimuth of a (degs)
- $v_e$ the east component of velocity (m/s)
- $v_n$ the north component of velocity (m/s)

Figure 1:
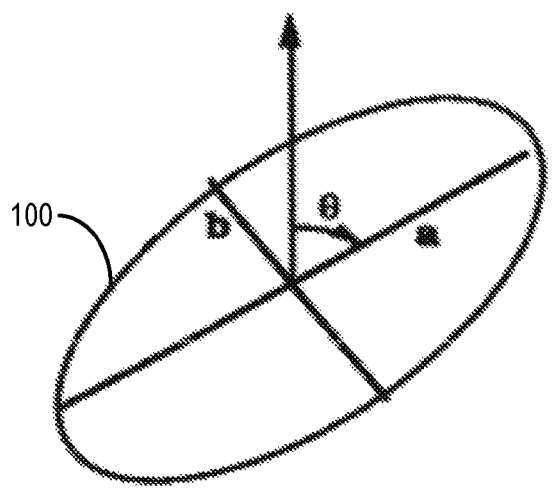
FIG. 1 illustrates a Global Positioning System (GPS) statistical confidence region for position.

FIG. 1 illustrates a GPS statistical confidence region for position. As illustrated in FIG. 1, GPS position estimates have an associated statistical confidence region in two dimensions, which can be represented by ellipse 100. The parameters of ellipse 100 (a, b, θ) define a confidence region (e.g., a 39% confidence region), provided the parameters are derived as described by Equations [1] through [4] below. The covariance matrix associated with the GNSS position solution is given by $$\begin{bmatrix} \sigma_e^2 & \sigma_{en} \\ \sigma_{en} & \sigma_n^2 \end{bmatrix}, \quad [1]$$

where $\sigma_e$(m) and $\sigma_n$(m) is the uncertainty of the GPS covariance matrix in the east and north directions, respectively, and $\sigma_{en}$(m) is the covariance between the east and north components. The parameters a, b, θ can be derived from Equation [2] by $$a = \sqrt{\frac{1}{2}(\sigma_e^2 + \sigma_n^2) + \sqrt{\frac{1}{4}(\sigma_e^2 - \sigma_n^2)^2 + \sigma_{en}^2}}, \quad [2]$$

$$b = \sqrt{\frac{1}{2}(\sigma_e^2 + \sigma_n^2) - \sqrt{\frac{1}{4}(\sigma_e^2 - \sigma_n^2)^2 + \sigma_{en}^2}},$$

$$\theta = -\frac{1}{2}\tan^{-1}\left(\frac{2\sigma_{en}}{\sigma_e^2 - \sigma_n^2}\right),$$

where

- a the semi-major axis (m) of the position uncertainty confidence region at a probability level (e.g., a 39% probability level),
- b the semi-minor axis (m) of the position uncertainty confidence region at a probability level (e.g., a 39% probability level),
- θ the azimuth of a (degs).

Note that most GPS receiver estimation processes output a and b scaled by 2.45 to achieve a confidence region with a 95% probability level. The covariance matrix can be recovered from the parameters a, b, θ using Equation [3] given by $$\sigma_{en}^2 = \frac{(a^2 - b^2)^2}{4} \cdot \frac{\tan^2(-2\theta)}{\tan^2(-2\theta) + 1}, \quad [3]$$

$$\sigma_e^2 = \frac{1}{2}\left(\frac{2\sigma_{en}}{\tan(-2\theta)} + a^2 + b^2\right),$$

$$\sigma_n^2 = \frac{1}{2}\left(-\frac{2\sigma_{en}}{\tan(-2\theta)} + a^2 + b^2\right).$$

In the event that only horizontal distance root means square (DRMS) uncertainty, $\sigma_{DRMS}$ which has a 63-68% confidence region, is available from the GPS receiver, the following covariance matrix should be used.

$\sigma_{en}^2 = 0$, $\sigma_e^2 = (\sigma_{DRMS}^2)/2$, $\sigma_n^2 = (\sigma_{DRMS}^2)/2$. [4]

GPS Velocity

Often the GPS velocity information is provided as speed $\|v\|$ and direction of travel α rather than velocity in the east and north directions. The direction of travel can be defined as the clockwise azimuth angle from true north. This relationship is given by $$\alpha = \tan^{-1}\frac{v_e}{v_n}, \quad [5]$$

$$\|v\| = \sqrt{v_e^2 + v_n^2},$$

$$v_e = \|v\|\sin(\alpha),$$

$$v_n = \|v\|\cos(\alpha).$$

Map-Match Likelihood

The quality of an instantaneous map-match can be given by the weighted combination of the distance to the road link point and the difference between the road link azimuth and the GPS direction of travel (azimuth with respect to truth north). This can be expressed in probabilistic terms by evaluating the following multivariate normal distribution given by $$p(z_k | x_j) = \frac{1}{\sqrt{(2\pi)^n |R_k|}} e^{-\frac{1}{2}(z_k - x_j)^T R_k^{-1}(z_k - x_j)}, \quad [6]$$

where

- $p(z_k|x_j)$ is the probability of the measurements given a specific road link point j,
- n is the number of measurements (e.g., n=3) for GPS position and azimuth as inputs,
- $z_k$ is the vector of measurements for the $k^{th}$ epoch,
- $R_k$ is the measurement covariance matrix.

The term $z_k - x_j$ in [6] can be evaluated as follows:

$$z_k - x_j = \begin{bmatrix} \frac{(\lambda_k - \lambda_j)}{(N+h)\cos(\lambda_k)} \\ \frac{(\phi_k - \phi_j)}{(M+h)} \\ \alpha_k - \alpha_j \end{bmatrix}, \quad [7]$$

where $\varphi_k$ and $\lambda_k$ is the position measurement, h is the associated height measurement (WGS84), if available (h=0 otherwise), $\varphi_j$ and $\lambda_k$ is the road link position, M is the meridian radius of curvature, N is the prime vertical radius of curvature, $\alpha_k$ is the measured azimuth, $\alpha_j$ is the road link azimuth, The meridian radius of curvature (for WGS84) can be calculated by $$M = \frac{a(1-e^2)}{W},$$ [8]

where $$a = 6378137.0,$$ [9]
$$e^2 = 0.00669437999014132,$$
$$W = \sqrt{1 - e^2 * \sin^2(\phi)}.$$

The prime vertical radius of curvature can be calculated by $$N = \frac{a}{W}.$$ [10]

Variance-Covariance of Observations

The variance of the observations $R_k$ can be given by $$R_k = \begin{bmatrix} \sigma_e^2 + \sigma_{map}^2 & \sigma_{en} & 0 \\ \sigma_{en} & \sigma_n^2 + \sigma_{map}^2 & 0 \\ 0 & 0 & \sigma_\alpha^2 + \sigma_{\alpha lane}^2 + \sigma_{\alpha road}^2 \end{bmatrix}$$ [11]

Two new parameters are introduced in Equation [11] to account for uncertainty in the road-map data.

$\sigma_{map}$ is the map data uncertainty. The quality of the road model is included in the estimation by this parameter.

$\sigma_{\alpha lane}^2$ is the uncertainty in the vector direction of travel due to typical lane changes. This parameter may be a function of speed and or the road class or other road features.

$\sigma_{\alpha road}^2$ is the uncertainty in the vector direction of the road link data. This is due to map digitization (quantization). This parameter may be a function of the road class or other road feature information.

The term $\sigma_\alpha^2$ may not be output by the GPS estimation process. Since $\alpha$ is derived as a function of the GPS velocity, its variance is a function of the magnitude of the GPS velocity. Hence, there is an inverse exponential relationship between $\sigma_\alpha^2$ and GPS speed. In non-driving cases, $\alpha$ is not useful below speeds of 2 to 3 m/s and may likely just be an erroneous input. However, in driving cases, $\alpha$ is a filtered quantity that is the propagated direction of travel and may be useful even when static. Care should be taken to make more use of $\alpha$ when speeds are low when driving. One means of accomplishing this would be to only allow $\alpha$ to be used when the driving context is known and the GPS speed is below 2-3 m/s while the GPS position uncertainty is also below a threshold value (e.g., 30 m) given by $$\sigma_\alpha^2 \propto f(\|v\|).$$ [12]

If the user's device is mounted in a vehicle and angle measurements (e.g., gyro measurements) are available, then these angle measurements can be used in the GPS estimation process to output an enhanced course measurement. In this case, the variance of the course measurement $\sigma_\alpha^2$ is not necessarily a function of the GPS speed. The $\sigma_\alpha^2$ provided by the GPS estimation process may be used.

Calculation of Course Uncertainty from Velocity

The calculation of $\sigma_\alpha^2$ from GPS velocity is given by Equations [13]-[15].

$$\alpha = \operatorname{atan}\left(\frac{v_e}{v_n}\right)$$ [13]

$$a = \frac{\partial \alpha}{\partial v_n} = \frac{-v_e}{v_n^2} \frac{1}{1 + \left(\frac{v_e}{v_n}\right)^2}$$

$$b = \frac{\partial \alpha}{\partial v_e} = \frac{1}{v_n} \frac{2}{1 + \left(\frac{v_e}{v_n}\right)^2}$$

Applying Covariance Law gives $$y = f(z),$$ [14]

$$C_y = \frac{\partial f}{\partial z} C_z \frac{\partial f^T}{\partial z},$$

where, when applied to estimating course uncertainty, z and $C_z$ are the velocity states and associated covariance matrix, respectively, and $C_y = C_\alpha$ is the covariance of the course.

$$\frac{\partial f}{\partial z} = [a\ b]$$ [15]

$$C_z = \begin{bmatrix} \sigma_{v_n}^2 & \sigma_{ven} \\ \sigma_{ven} & \sigma_{v_e}^2 \end{bmatrix},$$

$$C_\alpha = \sigma_\alpha^2 = a^2 \sigma_{v_n}^2 + 2ab\sigma_{ven} + b^2 \sigma_{v_e}^2,$$

Note that there are three special cases including two special cases (case #2 and case #3) that require the application of the limit theorem. The unit for $\sigma_\alpha$ is radians.

Case #1. $v_n=0$, $v_e=0$: No solution.

Case #2. $v_n=0$, $v_e \neq 0$:

$$\sigma_\alpha^2 = \frac{\sigma_{v_n}^2}{v_e^2}.$$

Case #3. $v_e=0$, $v_n \neq 0$:

$$\sigma_\alpha^2 = \frac{\sigma_{v_e}^2}{v_n^2}.$$

Relative Likelihood of a Map-Match

The relative likelihood of a map-match with respect to all other considered map-matches in a set can be given by Equation [16]:

$$w_j = \frac{p(z_k \mid x_j)}{\sum_{i=1}^{N} p(z_k \mid x_j)}.$$  [16]

Particle Filter Approach to Map-Matching

Figure 7:
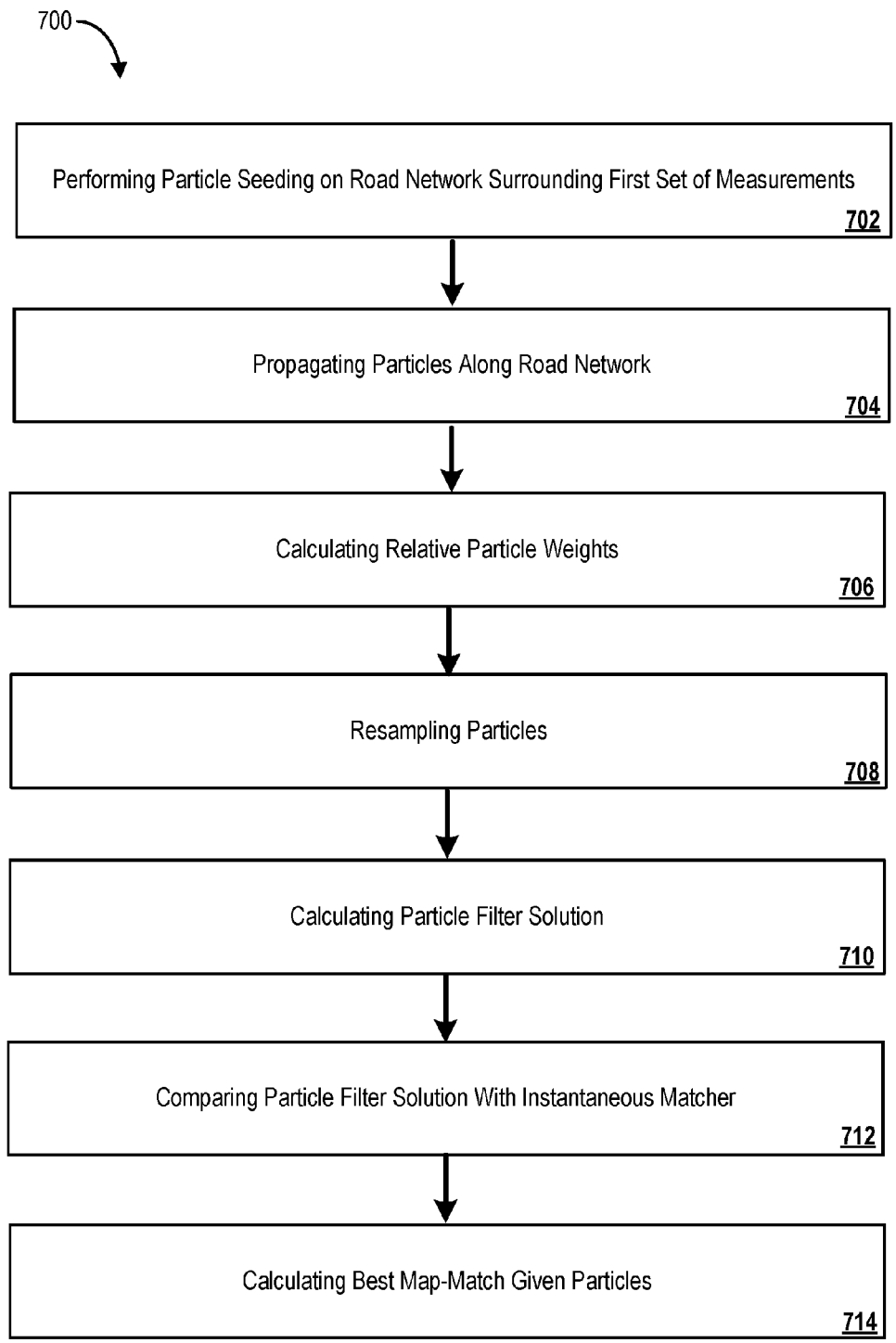
FIG. 7 is a flow diagram of an example process for determining location and direction of travel using map vector constraints.

FIG. 7 is a flow diagram of an example process 700 for determining location and direction of travel using map vector constraints. The basic concept of the particle filter is that a large number of particles are used to represent the state space distribution of the solution. The number of samples, N, must be sufficiently large to capture the distribution. In some implementations, process 700 can be implemented by system 800 as described in reference to FIG. 8.

In some implementations, process 700 can begin by performing particle seeding on a road network surrounding a first set of measurements (702), propagating the particles along the road network (704), calculating relative particle weights (706), resampling the particles (708), computing a particle filter solution (710), comparing the particle filter solution with an instantaneous matcher (712) and calculating a best map-match given the particles (714). Each of these process steps is described in more detail below.

A Particle as an Object

A particle is a spatial object that is constrained to the allowable map state space and contains the following information:
j, particle index, $i \in [0, 1, \ldots N-1]$,
φ, latitude constrained to the map
λ, longitude constrained to the map
a, altitude (above the geoid, approximate means sea level)
α, course or direction of travel based on the map
$p(z_k \mid x_j)$, instantaneous map-match likelihood (unfiltered)
$\omega_j$, instantaneous relative likelihood (unfiltered)
$r_k$, a road link index MM Particle Filter: Initialization Using Instantaneous-Scored Method The particle filter can be initialized given road map data and initial measurements from the set including position (latitude and longitude), direction of travel (GPS course) and speed. This seeding can be referred to as the calculation of the instantaneous-scored method.

Road map data is comprised of linear line segments. For each of the line segments within a distance, d, of the position measurement, the point on the line segment that is closest to the position can be evaluated using $p(z_k \mid x_j)$ given by Equation [6]. These points can be used to assign particles using the following steps:
1. Obtain a set of measurements, including at least a position.
2. Calculate DRMS, a 2-dimensional (1D) measure of the position uncertainty.

DRMS=$\sqrt{a^2 b^2}$

Note: when a and b are not available, DRMS can be the reported uncertainty statistic. This statistic can have a 63-68% probability region.
3. If DRMS>x meters (e.g., 100 m), the particle filter solution is not good enough and the next available solution should be used.
4. Calculate d, the distance to use when searching for surrounding road links in the road network.
   An example value ford can be d=min(max(3.0*DRMS, 50.0), 300).
5. Search for the road links (linear segments) within the distance, d, of the position
6. Find the closest point on each road link and the direction of travel for this link point, $x_{j=1 \ldots N}$. If there are two possible directions of travel for a road link, then there may be two road link sets with the same road link position but opposite directions of travel.
7. Assign a particle to each of these road link points. Each particle has an associated state vector $x_j$.
8. Calculate the scores for each assigned particle $p(z_k \mid x_j)$.
9. Calculate the relative likelihoods for each particle $\omega_j$ for each assigned particle.
10. Store the solutions for the particles with the highest and second highest relative likelihoods.
11. Compute the ratio of the highest to the second highest stored relative likelihood values. If this ratio value exceeds a threshold, $r > r_{instant}$, then it may be reasonable to release an instantaneous map-match solution.
12. Use the resampling process to assign the remaining particles (without replacement of the already assigned particles).
13. Since many particles are often assigned to the same location on a road link, this is equivalent to a potential solution with a very low uncertainty. This may be an undesirable way to seed the particle filter. Thus, additional process noise can be added to the ensuring prediction step following initialization.

MM Particle Filter: Prediction

Particles can be propagated in a one-dimensional sense along road links and across intersections. This propagation is governed by Equation [17]:

$$d_k = d_{k-1} + v\Delta T + q$$  [17]

$$v = \frac{(v_{k-1} + v_k)}{2.0}$$

$$q \in N(0, \sigma_q^2)$$

$$\sigma_q^2 = \sigma_r^2 + \sigma_v^2 + \sigma_{\epsilon_v}^2$$

$$\sigma_r^2 = \sigma_{roughening}^2$$

$$\sigma_{roughening\,static}^2 = \sigma_{rs}^2 = 1.0 \cdot \Delta T^2$$

$$\sigma_{roughening\,moving}^2 = \sigma_{rm}^2 = 2.0 \cdot \Delta T^2$$

$$\sigma_v^2 = (0.25\sigma_{v_k}^2 + 0.25\sigma_{v_{k-1}}^2)\Delta T^2$$

$$\sigma_{\epsilon_v}^2 = \left(\frac{v_k - v_{k-1}}{4}\right)^2 \Delta T^2$$

where
ΔT is the time difference between updates
$d_k$ is the distance along a line at time k
$d_{k-1}$ is the distance along a line at time k−1
v is the average speed over the timespan between $t_{k-1}$ and $t_k$
q is a process noise value that is randomly selected from a zero-mean normal distribution.
$\sigma_q^2$ is the variance of the process noise.
$\sigma_{roughening}^2$ or $\sigma_r^2$ is the process noise added to prevent sample impoverishment and to provide a base level of system process noise. This is one of two values for moving and not-moving cases based on motion context from accelerometers.

$\sigma_v^2$ is the process noise added due to uncertainty in the speed estimates provided by the GPS receiver or modeled.

$\sigma_{\varepsilon_v}^2$ is the process noise added due to non-linearity in the speed used for the prediction step. This is one-half of the maximum speed error in the average speed estimate. The worst-case average speed error is a step function between k−1 and k, which is half the speed difference. Half of half the speed difference (¼ of the speed difference) is a good nominal process noise value. For example, if the maximum speed difference is 10 m/s, then the maximum average speed error is 5 m/s and the additional process noise would be 2.5 m/s squared multiplied by the squared time difference.

Process Noise Example

Figure 2:
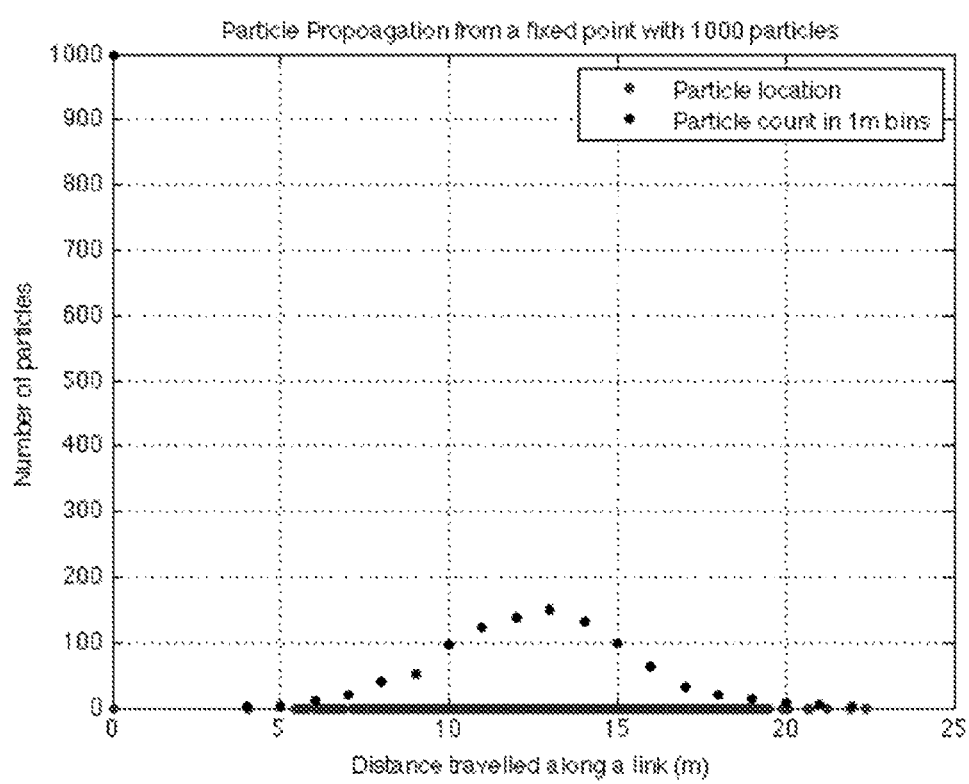
FIG. 2 is a graph illustrating a particle propagation example.

FIG. 2 is a graph illustrating a particle propagation example. The following values demonstrate an example case for finding the appropriate distribution from which to draw process noise samples. This is visualized in FIG. 2.

At the first epoch, all the particles are located at distance $d_1=0$. There are 100 particles, which are propagated along the link based on the following information.

$$\Delta T = 1.0 \quad [18]$$
$$v_k = 10 \text{ (m/s)}$$
$$v_{k-1} = 15 \text{ (m/s)}$$
$$v = \frac{(v_{k-1} + v_k)}{2.0} = \frac{10.0 + 15.0}{2.0} = 12.5 \text{ (m/s)}$$
$$d_1 = 0$$
$$d_2 = d_{k-1} + v\Delta T + q = 12.5 + q$$
$$\sigma_{v_k} = 1.8 \text{ (m/s)}$$
$$\sigma_{v_{k-1}} = 3.2 \text{ (m/s)}$$
$$\sigma_v^2 = \left(0.25\sigma_{v_k}^2 + 0.25\sigma_{v_{k-1}}^2\right)\Delta T^2 = 3.7 \text{ m}^2$$
$$\sigma_{\varepsilon_v}^2 = \left(\frac{v_k - v_{k-1}}{4}\right)^2 \Delta T^2 = 1.5625 \text{ m}^2$$
$$\sigma_r^2 = \sigma_{r_m}^2 = 2\Delta T^2 = 2.0 \text{ m}^2$$
$$\sigma_q^2 = 2.0 + 3.7 + 1.5625 = 7.2625 \text{ m}^2$$
$$q \in N(0, \sigma_q^2) = q \in N(0, 7.2625 \text{ m}^2)$$

Example Particle Propagation when Static

Figure 3:
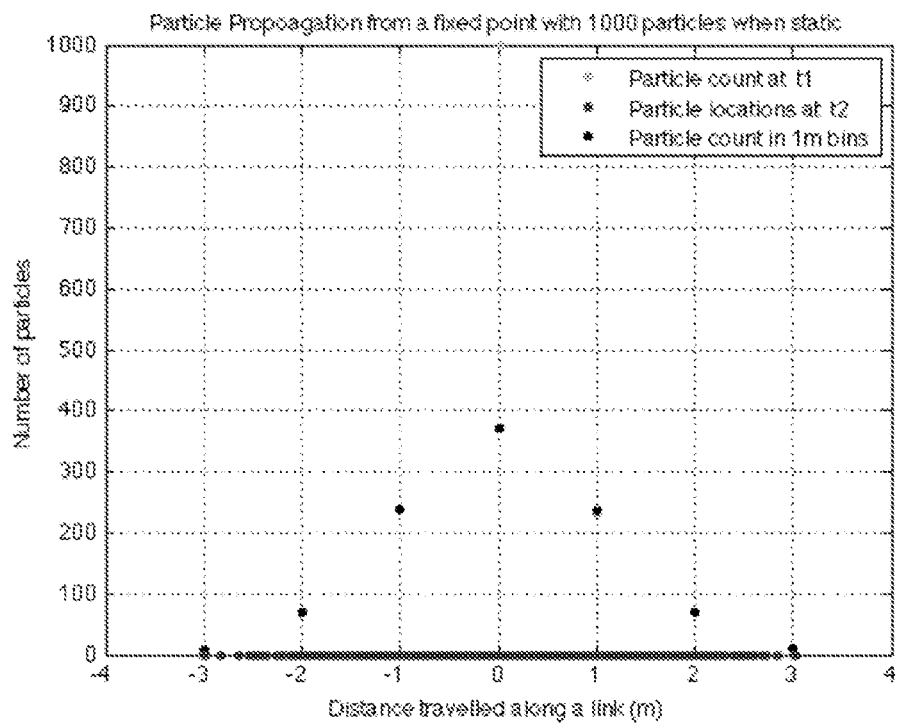
FIG. 3 is a graph illustrating a particle propagation example when static.

FIG. 3 is a graph illustrating a particle propagation example when static. The following values demonstrate a static example case for finding the appropriate distribution from which to draw process noise samples. This is visualized in FIG. 3.

At the first epoch, all the particles are located at distance $d_1=0$. There are 1000 particles, which are propagated along the link based on the following information.

$$\Delta T = 1.0 \quad [19]$$
$$v_k = 0 \text{ (m/s)}$$
$$v_{k-1} = 0 \text{ (m/s)}$$
$$\sigma_{v_k} = 0.0 \text{ (m/s)}$$

-continued $$\sigma_{v_{k-1}} = 0.0 \text{ (m/s)}$$
$$\sigma_v^2 = \left(0.25\sigma_{v_k}^2 + 0.25\sigma_{v_{k-1}}^2\right)\Delta T^2 = 0 \text{ m}^2$$
$$\sigma_{\varepsilon_v}^2 = \left(\frac{v_k - v_{k-1}}{4}\right)^2 \Delta T^2 = 0 \text{ m}^2$$
$$\sigma_r^2 = \sigma_{r_s}^2 = 1.0\Delta T^2 = 10 \text{ m}^2$$
$$\sigma_q^2 = 1.0 = 1.0 \text{ m}^2$$
$$q \in N(0, \sigma_q^2) = q \in N(0, 1.0 \text{ m}^2)$$

Making Use of Moving/not-Moving Indications

The moving/not-moving indication computed by context detection using on-device motion sensors (e.g., accelerometers) can be used to force the velocity used in the prediction step to zero and to reduce the process noise used in the prediction step. If static, the following applies.

$$v_k = 0 \text{ (m/s)} \quad [20]$$
$$v_{k-1} = 0 \text{ (m/s)}$$
$$\sigma_{v_k} = 0.0 \text{ (m/s)}$$
$$\sigma_{v_{k-1}} = 0.0 \text{ (m/s)}$$
$$\sigma_v^2 = \left(0.25\sigma_{v_k}^2 + 0.25\sigma_{v_{k-1}}^2\right)\Delta T^2 = 0 \text{ m}^2$$
$$\sigma_{\varepsilon_v}^2 = \left(\frac{v_k - v_{k-1}}{4}\right)^2 \Delta T^2 = 0 \text{ m}^2$$
$$\sigma_q^2 = \sigma_r^2$$

Propagation of Particles Across Intersections

Particles are propagated along road links until they hit an intersection. Particles are propagated onto new links following the intersection using the following concepts.

If there is only one outgoing link, then the selection is trivial.

If there are multiple outgoing links with equal likelihood of travel, then particles are randomly assigned to propagate along the new links If additional information is known about the outgoing road links, then more particles may be assigned to certain outgoing links than others. These cases include the following.

If the incoming link is a freeway and the outgoing links are a freeway and an offramp, then the freeway is favored unless routing information is available and indicates that the offramp should be taken. In the latter case, the off-ramp is favored.

If the outgoing links have different road class, then one road class may be favored more than another.

If routing information is available, then the outgoing road link indicated by the routing information is potentially favored.

MM Particle Filter: Update

The update step includes calculating the relative particle weights given a new set of measurements and resampling of the particles.

Calculation of Relative Particle Weights

Following the prediction step, particles are updated based on the set of available measurements (including position) by computing $p(z_k|x_j)$ and $w_j$ from Equations [6] and [16], respectively.

Use of Activity Detection

If activity detection using motion sensors (e.g., accelerometers) is enabled, and pedestrian motion is detected, it is important that the calculation of $p(z_k|x_j)$ and $w_j$ do not use course information.

Resampling

Resampling is performed using the following steps:
1. Create a new vector of unassigned particle of length N
2. Generate a random number, $r_i$, that is uniformly distributed on [0,1]. For computational efficiency, a number of random vectors, that are indexed based on particle index, could be generated offline and stored for use.
3. Accumulate the relative likelihoods, $w_j$, into a cumulative summation vector, CSW. This vector has N elements
4. For each $r_i$:
    a. Find the index of the first element in $CSW_i$ that is greater than or equal to r
    b. Copy the particle with this index into the new particle vector
    c. Assign the particle a relative likelihood, $w_i = N^{-1}$ The above method is described in, for example, Simon, D., "Optimal State Estimation," John Wiley and Sons Inc. (2006), p. 467 and in Ristic, B., S. Arulampalam and N. Gordon, "Beyond the Kalman Filter, Particle Filters for Tracking Applications," Artech House (2004), p. 41. Each of these references is incorporated by reference herein in its entirety.

MM Particle Filter: Depletion Check

Every few epochs, the solution should be checked for complete sample impoverishment or solution depletion. This could occur for various reasons include accumulated errors in particle prediction, travel over an undocumented road link (e.g., across a parking lot), map errors, etc. The check is accomplished by running the particle filter initialization steps in a parallel solution (up to step 12). The current particle filter solution is compared to the best and second-best solutions from the initialization method using a ratio test. If the ratio test exceeds a threshold value, then the particle filter is re-seeded with this information.

MM Particle Filter: Solution Extraction

The challenge in solution extraction is that the particles can be distributed across connected links. If single links are compared independently, then an erroneous solution could be extracted. This problem is illustrated by FIG. 4 and FIG. 5.

Figure 4:
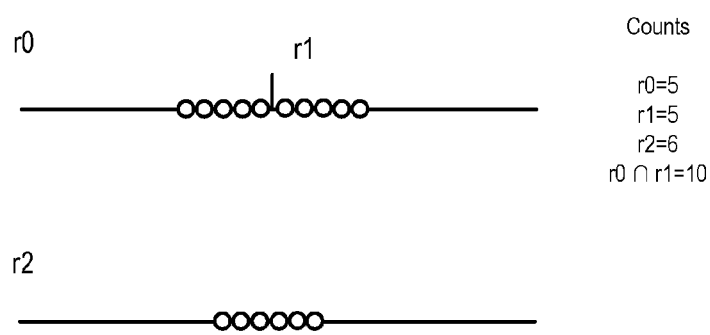
FIG. 4 illustrates a solution extraction with two connected road links.

In FIG. 4, the best solution is clearly the union of the particles across the connected links $r_0$ and $r_1$. If individual links only were considered, then the first moment (mean) of the particles on $r_2$ would be selected as the most likely solution.

Figure 5:
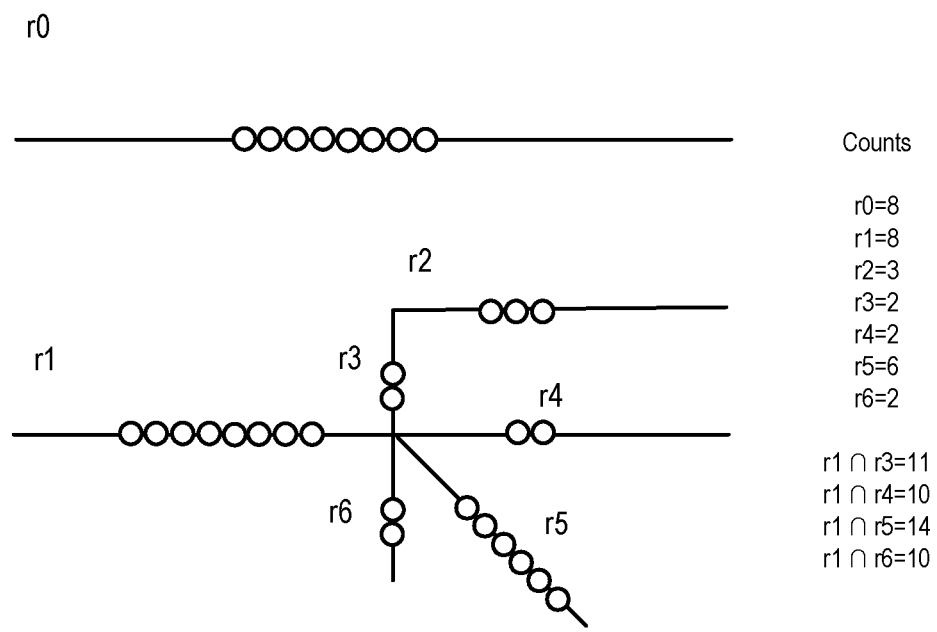
FIG. 5 illustrates a solution extraction with multiple connected links.
Figure 6:
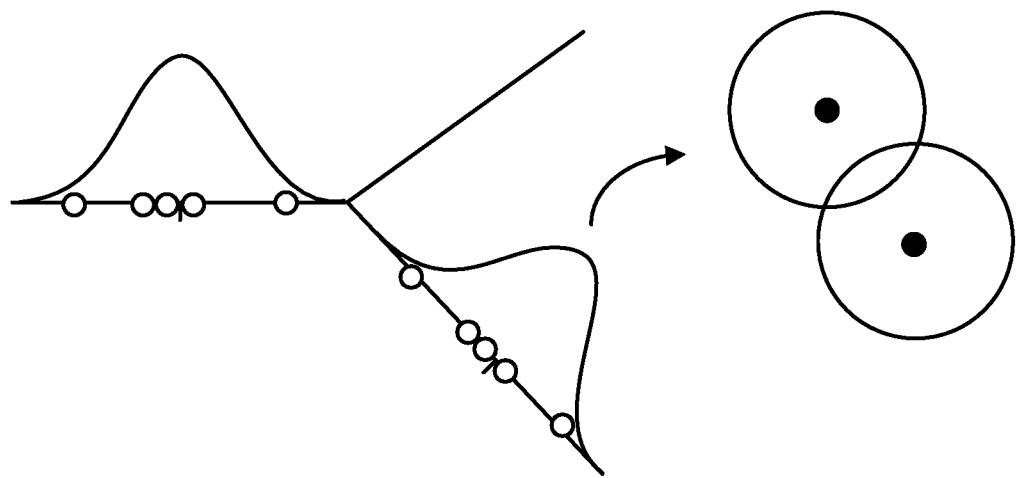
FIG. 6 illustrates a solution union detected between connected links.

In FIG. 5, the solution is most likely within the intersection of $r_1$ and $r_5$, and it is clear that only using individual links does not provide the most likely solution. The concept of solution union across connected links is not quite this simple as particles could be spread far along both connected links. Thus, the first and second movements of the particle distributions along two connected links are used to detect potential solution union. This concept is illustrated in FIG. 6. Note, that solution from the union between only two links is considered. This is based on the fact that a user always moves from one link to one other link. It may be that the particles are spread amongst all the outgoing links of an intersection but it is likely that the single union between the two most likely links will be a higher relative likelihood solution than a solution that is not part of the intersection.

The method to determine the most likely solution is as follows.
1. Determine the possible road links
2. For each road link:
    a. Compute the mean distance and the variance of the particles along the road link. Compute the position associated with the mean distance along the road link,
    b. Generate a list of connected road links.
3. For each road link, k
    a. Count the number of particles within $\Gamma$ times the standard deviation of the mean distance, $N_i$.
    b. Compute the relative likelihood of this solution as the number of particles divided by the total number of particles, $w_k = N_k/N$.
    c. Add this solution to the list of possible solutions.
    d. For each connected road link, j
        i. Check if $w_{ij}$, i.e., $w_{ji}$, is already included in the list of possible solutions.
        ii. Examine the connected road links to see if there is a probable overlap of the solutions of both links. If the mean position plus or minus $\Gamma$ times the standard deviation of the solution (e.g., $\Gamma=3$) includes the solution from the other road link, then the union of the two road links should be considered.
        iii. If overlapped, count the number of particles within $\Gamma$ times the standard deviation of the mean position of the union of the two road links.
        iv. If overlapped, compute the relative likelihood of the solution as the number of particles divided by the total number of particles, $w_{ij} = N_{ij}/N$.
        v. If overlapped, add this solution to the list of possible solutions.
4. Sort the list of possible solutions by relative likelihood.
5. Compute the ratio of the best solution to the second best solution.
6. If the best solution is a union solution or the best solution is part of the union with the second best solution, apply the special intersection logic described below. Otherwise, compute the ratio of the best to second best solution and output this ratio with the map-match solution.

Intersection Cases

If the best solution is part of the union with the second best solution, then special intersection logic applies. The desired behavior is to create lag in the filtered output so that the solution is biased to the intersection entry until enough information is present to leave the intersection and transition onto the correct road. These additional steps apply.
1. Compare the relative likelihood of the incoming road link with the outgoing road link using a ratio test.
2. If the outgoing solution passes the ratio test, then output this solution as the map-match.
3. If the ratio test fails, then use the solution from only the incoming link. One might argue that the combined union of particles from the incoming and outgoing road links should be used but this could pull the solution onto the wrong outgoing link and cause a re-route.

Assessing Number of Particles Needed

A well-designed particle filter will run with a low level of solution degeneracy. A suitable measure of degeneracy is the effective sample size, $N_{eff}$, which is given by $$N_{eff} = \frac{1}{\sum_{i=1}^{N}(w_i)^2}. \quad [21]$$

If $N_{eff}$ is close to 1, the solution is degenerate. However, $N_{eff}$ is computed prior to resampling, and in some intersection cases, one or two particles will best represent the possible solution, and $N_{eff}$ for the subsequent epoch will be valid.

On Road Versus Off Road

If the user is not on the road, then the assumption that the solution is constrained by the road network is incorrect. This case can be handled with a state machine that has entry and exit criteria for On Road versus Off Road. The criteria to reach the Off Road state are tested first and include:
If the GPS speed is valid and less than a threshold:
  Activity Context==Running
  Activity Context==Walking with better than low reliability
  Distance cross check fails gross distance test
  Course cross check fails course difference test (with hysteresis)
  Ratio test fails (with hysteresis)
else:
If the Off Road state is not achieved then the On Road state criteria are tested. The entrance and exit for On Road state include the following conditions:
  If GPS speed is valid and higher than a threshold:
    The ratio test passes for at least two consecutive epochs
  else:
    The state is indeterminate.
The conditions to Not Match are given by [22]

$$\hat{\sigma}_0^2 = \frac{(z_k - x_j)^T R_k^{-1}(z_k - x_j)}{m}, \quad [22]$$

where
$z_k$ is the vector of measurements for the $k^{th}$ epoch
$x_j$ is the vector of road link states for road link point j
$R_k$ is the measurement covariance matrix
m is the degrees of freedom, length ($z_k$)
If $\hat{\sigma}_0^2 <= 1$:
  The snap solution matches the observation very well.
If $\hat{\sigma}_0^2 > 1$:
  There is mismatch between the observation and the snap point.
  The snap or the observation could be biased.
  The snap could be good but the observation uncertainty is poorly modeled. For example, if the observation is 5 m from the snap point but has a DRMS uncertainty of 150 m.
  The snap position could be good but the direction of travel may mismatch due to map vector quantization. The outbound road at an intersection is digitized to a distinct direction of travel. Quantization of the map vector thus leads to higher variance factors when starting a turn until the observation direction of travel matches the road vector. One way to reduce the effect on the variance factor is to increase the observation direction of travel uncertainty when turning close to an intersection. This could be accomplished, when mounted, using gyro and accelerometer measurements at, for example, 10 Hz.
  The snap could be good but the observations are biased. For example, a 50 m along track error in downtown San Francisco.
If $\hat{\sigma}_0^2 >> 1$:
  The snap cannot be trusted because it is incorrect or the observation is biased.

Using Road Width Information to Evaluate Candidate Road Points

Figure 11:
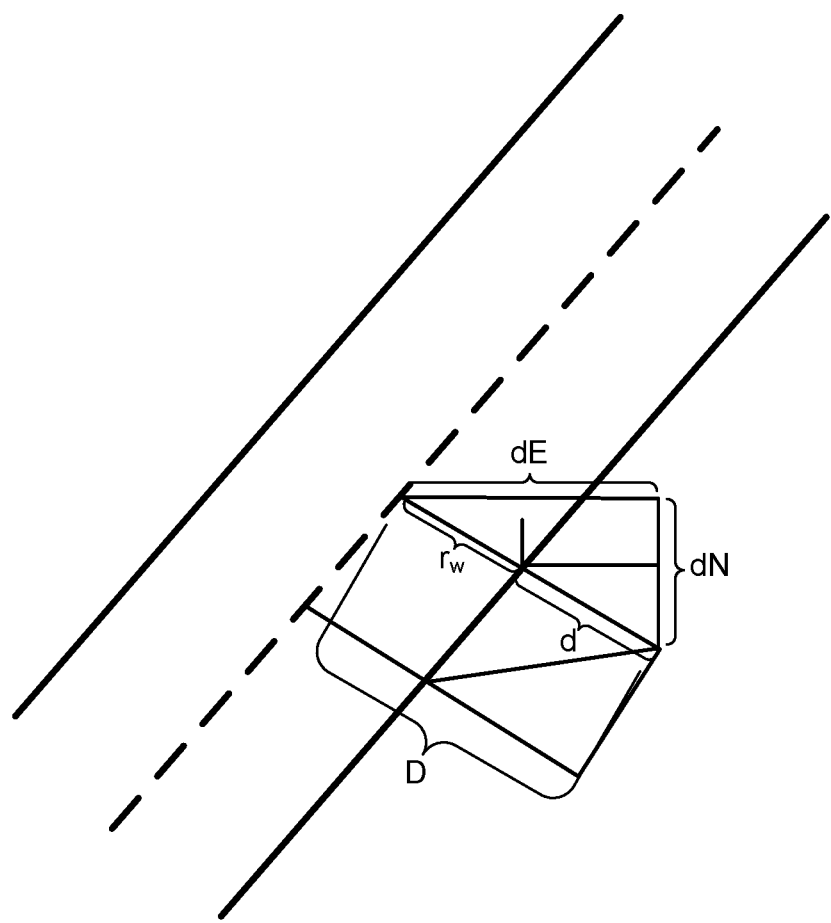
FIG. 11 illustrates a method of constraining candidate road points to be on a road.

Roads can be represented in a map database by a vector along the centerline of the road. Given an estimated position input (e.g., GPS data), we want to evaluate candidate road points given the input and road width information. Due to an error in position estimate (e.g., GPS position estimate), a position estimate can be located off the road. In these cases, a candidate road point can be located on the road but not on the centerline by moving the estimated position a distance d to a point on the road. Referring to the geometry shown in FIG. 11 (assuming only cross-track error), the distance d is given by $$D = \sqrt{dE^2 + dN^2} \quad (23)$$

$$d = D - r_w, \quad (24)$$

where, $r_w$, is known road width and dE and dN are changes in direction in the east and north directions, respectively due to the position estimate. Roads can be classified in the system, where each road has a known width (e.g., a freeway road class). Cases where there is an along track error can be similarly evaluated based on geometry. This allows evaluation of candidate road points on the road rather than on the road centerline.

Map-Matching for Pedestrians

In most cases, it may not be desirable to snap a pedestrian to a road. However, there are instances when GPS data is prone to error, such as in a dense urban environment. In these cases, a delta value can be added to a GPS position estimate to "snap" the pedestrian onto the road, and thus constrain the solution to be on the road. In some implementations, an example delta value can be x times (e.g., x=3) the road width, $r_w$.

In some implementations, logic can be used to assist map matching when the device is in a dense urban environment. For example, a GPS receiver operating in a lower power mode could indicate that the device is in a dense urban environment. A lack of access points in a WiFi scan result could also indicate that the device is in a dense urban environment. In some implementations, pattern recognition algorithms can be applied to GPS signal strength to determine when the device is in a dense urban environment. Other logic for indicating GPS error prone environments is also possible.

Exemplary System

Figure 8:
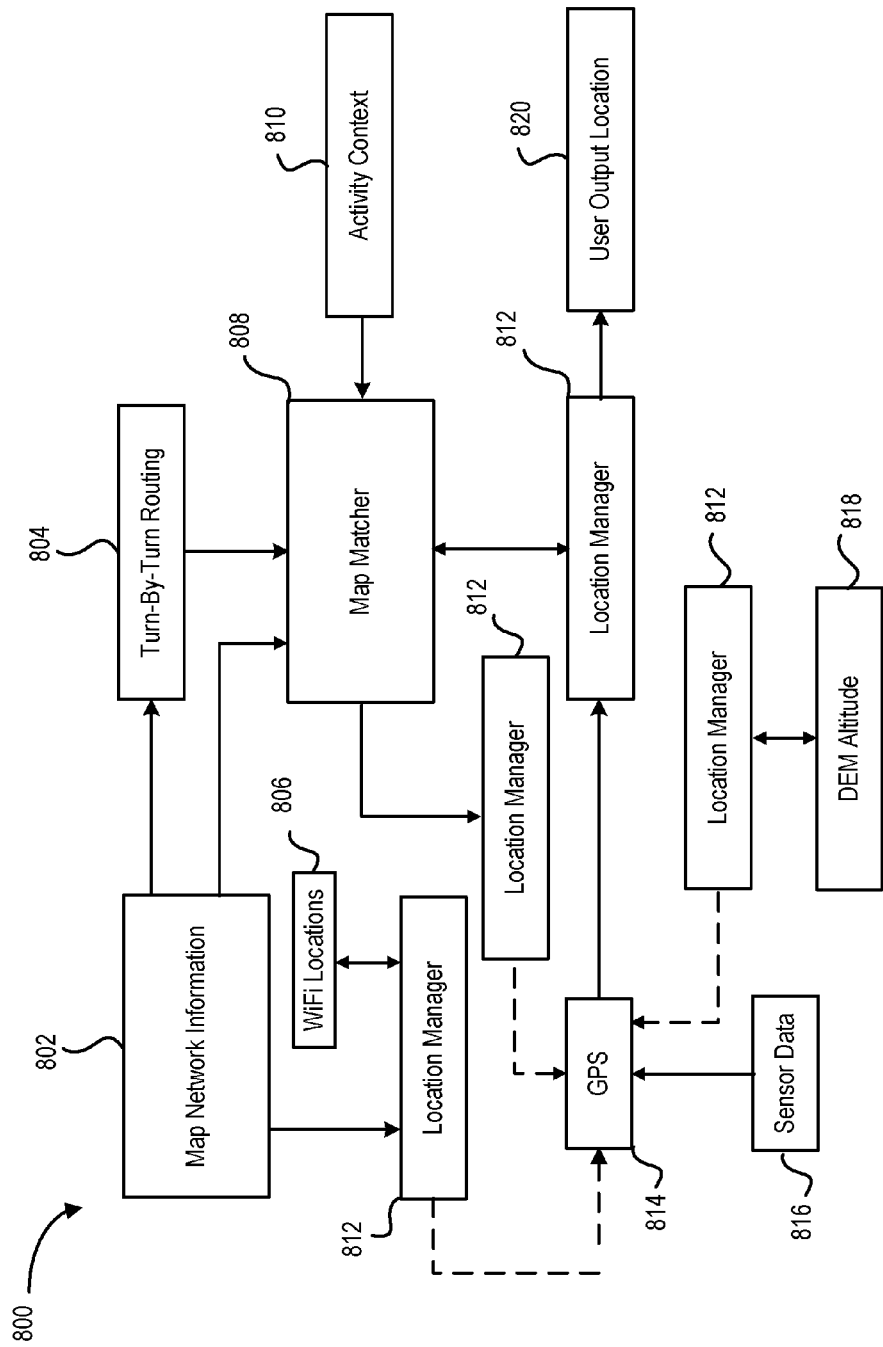
FIG. 8 is a block diagram of a system for determining location and direction of travel using map vector constraints.

FIG. 8 is a block diagram of a system 800 for determining location and direction of travel using map vector constraints.

In some implementations, system 800 can include turn-by-turn routing module 804, map matcher module 808, location manager 812 and positioning system 814 (e.g., GPS).

The processes described above can be performed by map matcher module 808. Map matcher 808 can be implemented in software, firmware, hardware or any combination of these. Map matcher 808 receives map network information 802, turn-by-turn routing data 804 and activity context data 810. Map matcher 808 processes this information as previously described in reference to FIGS. 1-7, and outputs map matching results to location manager 812.

Location manager 812 receives map network information 802, WiFi location data 806 and altitude data 818. Location manager 812 communicates with GPS module 814, which receives sensor data from motion sensors, such as accelerometers and gyros, for example. Location manager 812 outputs user location data to other applications.

Exemplary Operating Environment

Figure 9:
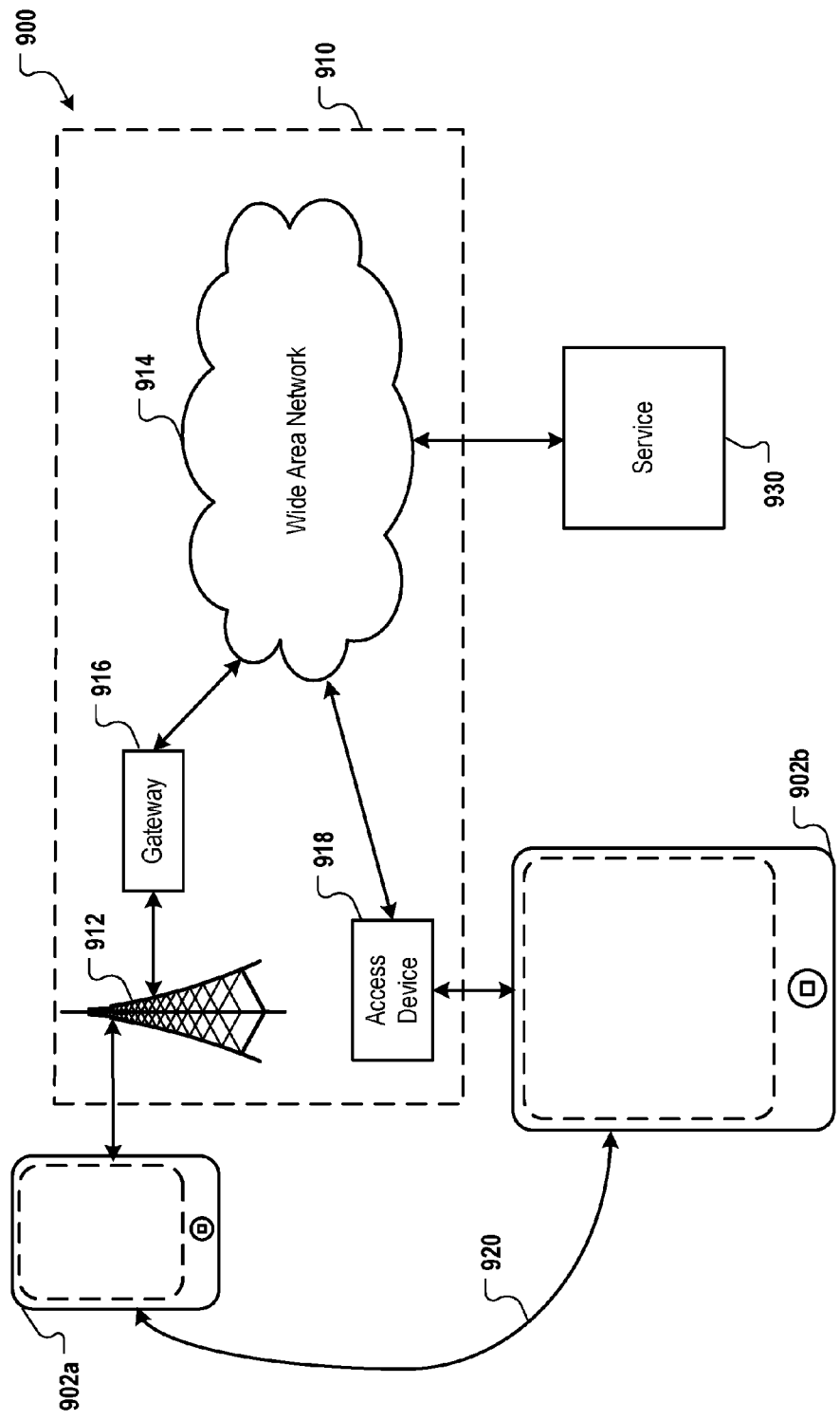
FIG. 9 is a block diagram of an exemplary operating environment capable of determining location and direction of travel of a mobile device using map vector constraints.

FIG. 9 is a block diagram of an exemplary operating environment capable of determining location and direction of travel of a mobile device using map vector constraints.

In some implementations, devices 902a and 902b can communicate over one or more wired or wireless networks 910. For example, wireless network 912 (e.g., a cellular network) can communicate with a wide area network (WAN) 914 (e.g., the Internet) by use of gateway 916. Likewise, access device 918 (e.g., IEEE 802.11g wireless access device) can provide communication access to WAN 914. Devices 902a, 902b can be any device capable of displaying GUIs of the disclosed content authoring application, including but not limited to portable computers, smart phones and electronic tablets. In some implementations, the devices 902a, 902b do not have to be portable but can be a desktop computer, television system, kiosk system or the like.

In some implementations, both voice and data communications can be established over wireless network 912 and access device 918. For example, device 902a can place and receive phone calls (e.g., using voice over Internet Protocol (VoIP) protocols), send and receive e-mail messages (e.g., using SMPTP or Post Office Protocol 3 (POP3)), and retrieve electronic documents and/or streams, such as web pages, photographs, and videos, over wireless network 912, gateway 916, and WAN 914 (e.g., using Transmission Control Protocol/Internet Protocol (TCP/IP) or User Datagram Protocol (UDP)). Likewise, in some implementations, device 902b can place and receive phone calls, send and receive e-mail messages, and retrieve electronic documents over access device 918 and WAN 914. In some implementations, device 902a or 902b can be physically connected to access device 918 using one or more cables and access device 918 can be a personal computer. In this configuration, device 902a or 902b can be referred to as a "tethered" device.

Devices 902a and 902b can also establish communications by other means. For example, wireless device 902a can communicate with other wireless devices (e.g., other devices 902a or 902b, cell phones) over the wireless network 912. Likewise, devices 902a and 902b can establish peer-to-peer communications 920 (e.g., a personal area network) by use of one or more communication subsystems, such as the Bluetooth™ communication devices. Other communication protocols and topologies can also be implemented.

Devices 902a or 902b can communicate with service 930 over the one or more wired and/or wireless networks 910. For example, service 930 can be a mapping service that provides a mapping data that can be used by a client application on a device to provide the features and processes described in reference to FIGS. 1-8.

Device 902a or 902b can also access other data and content over one or more wired and/or wireless networks 910. For example, content publishers, such as news sites, Really Simple Syndication (RSS) feeds, Web sites and developer networks can be accessed by device 902a or 902b. Such access can be provided by invocation of a web browsing function or application (e.g., a browser) running on the device 902a or 902b.

Devices 902a and 902b can exchange files over one or more wireless or wired networks 910 either directly or through service 930.

Exemplary Device Architecture

Figure 10:
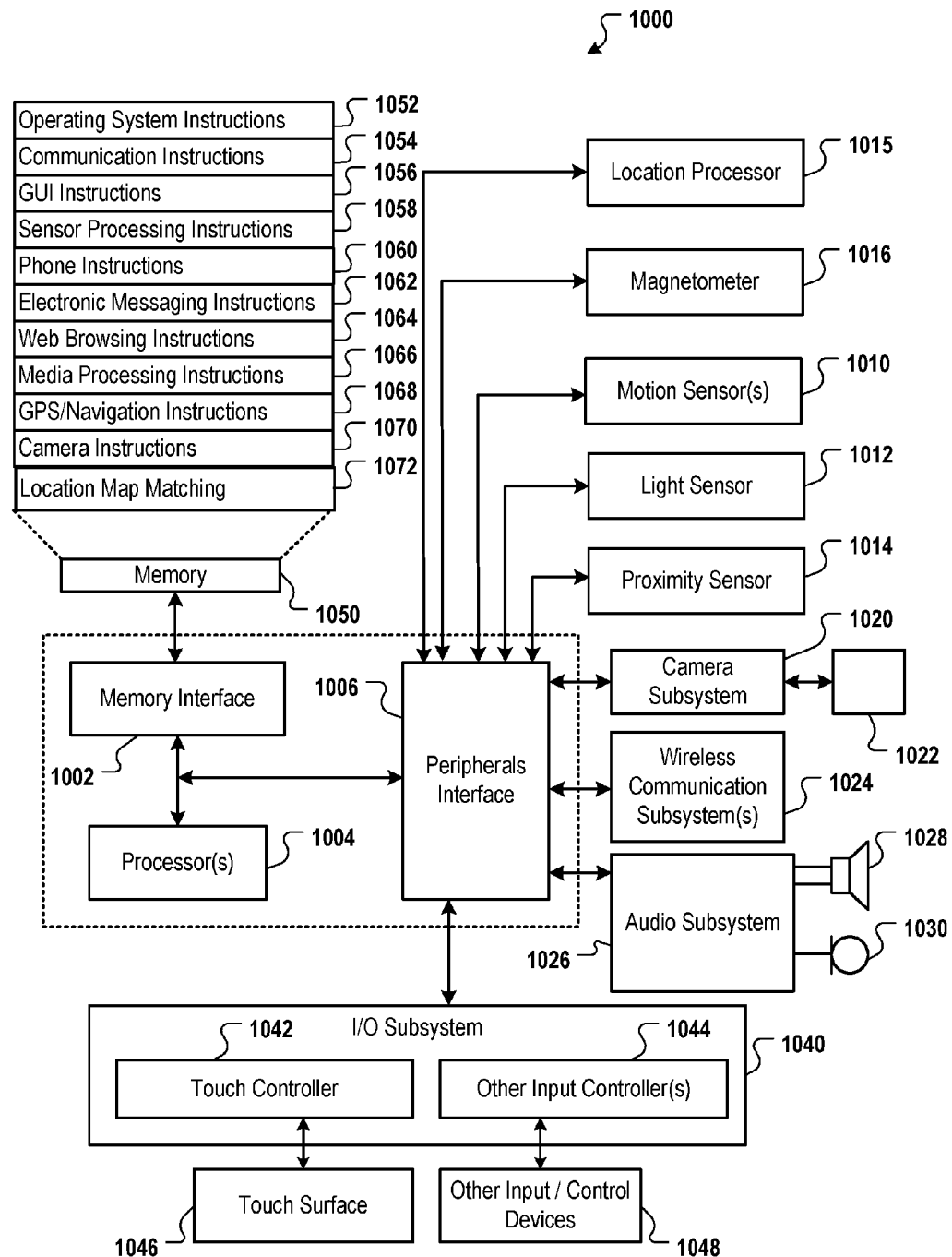
FIG. 10 is a block diagram of an exemplary architecture of a device capable of determining location and direction of travel using map vector constraints.

FIG. 10 is a block diagram of an exemplary architecture of a device capable of determining location and direction of travel using map vector constraints.

Architecture 1000 can be implemented in any device for generating the features described in reference to FIGS. 1-8, including but not limited to portable or desktop computers, smart phones and electronic tablets, television systems, game consoles, kiosks and the like. Architecture 1000 can include memory interface 1002, data processor(s), image processor(s) or central processing unit(s) 1004, and peripherals interface 1006. Memory interface 1002, processor(s) 1004 or peripherals interface 1006 can be separate components or can be integrated in one or more integrated circuits. The various components can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the device. For example, in some implementations, light sensor 1012 can be utilized to facilitate adjusting the brightness of touch surface 1046. In some implementations, motion sensor 1010 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 1006, such as a temperature sensor, a biometric sensor, or other sensing device, to facilitate related functionalities.

Location processor 1015 (e.g., GPS receiver) can be connected to peripherals interface 1006 to provide geo-positioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1024. Communication subsystem(s) 1024 can include one or more wireless communication subsystems. Wireless communication sub systems 1024 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 1024 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 1024 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1026 can be coupled to a speaker 1028 and one or more microphones 1030 to facilitate voice-enabled functions, such as voice recognition, voice replication, digital recording, and telephony functions.

I/O subsystem 1040 can include touch controller 1042 and/or other input controller(s) 1044. Touch controller 1042 can be coupled to a touch surface 1046. Touch surface 1046 and touch controller 1042 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1046. In one implementation, touch surface 1046 can display virtual or soft buttons and a virtual keyboard, which can be used as an input/output device by the user.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In some implementations, device 1000 can present recorded audio and/or video files, such as MP3, AAC, and MPEG files. In some implementations, device 1000 can include the functionality of an MP3 player and may include a pin connector for tethering to other devices. Other input/output and control devices can be used.

Memory interface 1002 can be coupled to memory 1050. Memory 1050 can include high-speed random access memory or non-volatile memory, such as one or more magnetic disk storage devices, one or more optical storage devices, or flash memory (e.g., NAND, NOR). Memory 1050 can store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers or servers. Communication instructions 1054 can also be used to select an operational mode or communication medium for use by the device, based on a geographic location (obtained by the GPS/Navigation instructions 1068) of the device. Memory 1050 may include graphical user interface instructions 1056 to facilitate graphic user interface processing, such as generating the GUIs shown in FIGS. 1-8 and 11; sensor processing instructions 1058 to facilitate sensor-related processing and functions; phone instructions 1060 to facilitate phone-related processes and functions; electronic messaging instructions 1062 to facilitate electronic-messaging related processes and functions as described in reference to FIGS. 1-8 and 11; web browsing instructions 1064 to facilitate web browsing-related processes and functions; media processing instructions 1066 to facilitate media processing-related processes and functions; GPS/Navigation instructions 1068 to facilitate GPS and navigation-related processes; camera instructions 1070 to facilitate camera-related processes and functions; and location map matching instructions 1072, which implement the processes described in reference to FIGS. 1-8 and 11. The memory 1050 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    initializing, by a computing device, a particle filter using a first set of state measurements, the initializing including selecting a first set of particles based at least in part on a satellite-based position measurement;
    assigning, by the computing device, each particle in the first set of particles to a road link of a road network based on a distance of the road link from the satellite-based position measurement and an uncertainty in the satellite-based position measurement;
    propagating, by the computing device, the particles along their respective road links;
    calculating, by the computing device, a second set of state measurements for the propagated particles;
    calculating, by the computing device, a particle weight for each propagated particle based on the second set of state measurements;
    resampling, by the computing device, the particles, the resampling including selecting a subset of the set of particles based on the particle weights;
    computing, by the computing device, a particle filter solution based on a union of particles in the subset of particles that were propagated along two or more road links; and
    calculating, by the computing device, a map-match based on the particle filter solution to determine a location and direction of the computing device,
    wherein the method is performed by one or more hardware processors of the computing device.

2. The method of claim 1, wherein the set of one or more road links is selected based on road width or changes in direction to the satellite-based position measurement.

3. The method of claim 1, wherein calculating a map-match based on the particle filter solution further comprises:
    determining, by the computing device, a ratio of a highest to a second highest relative likelihood values;
    determining, by the computing device, that the ratio exceeds a threshold; and
    responsive to the determining, generating an instantaneous map-match solution.

4. The method of claim 1, wherein the score is determined from a multivariate normal distribution given by $$p(z_k \mid x_j) = \frac{1}{\sqrt{(2\pi)^n |R_k|}} e^{-\frac{1}{2}(z_k - x_j)^T R_k^{-1}(z_k - x_j)},$$

and where $p(z_k|x_j)$ is a probability of measurements $x_j$ given a specific road link point, n is a number of satellite-based measurements, $z_k$ is a vector of measurements for a $k^{th}$ epoch and $R_k$ is a measurement covariance matrix.

5. The method of claim 4, wherein the relative likelihood value for a jth particle $w_j$ is given by $$w_j = \frac{p(z_k | x_j)}{\sum_{i=1}^{N} p(z_k | x_j)},$$

and where N is a positive integer equal to the number of particles.

6. The method of claim 1, wherein propagating the particles along the road links further comprises:
   determining, by the computing device, a motion context from a sensor of the computing device;
   determining, by the computing device, a process noise value based on the motion context; and
   propagating, by the computing device, the particles along the road links and across intersections using the process noise value.

7. A computing device comprising:
   one or more processors;
   memory coupled to the one or more processors and configured to store instructions, which, when executed by the one or more processors, causes the one or more processors to perform operations comprising:
      initializing a particle filter using a first set of state measurements, the initializing including selecting a first set of particles based at least in part on a satellite-based position measurement;
      assigning each particle in the first set of particles to a road link of a road network based on a distance of the road link from the satellite-based position measurement and an uncertainty in the satellite-based position measurement;
      propagating the particles along their respective road links;
      calculating a second set of state measurements for the propagated particles;
      calculating a particle weight for each propagated particle based on the second set of state measurements;
      resampling the particles, the resampling including selecting a subset of the set of particles based on the particle weights;
      computing a particle filter solution based on a union of particles in the subset of particles that were propagated along two or more road links; and
      calculating, by the computing device, a map-match based on the particle filter solution to determine a location and direction of the computing device.

8. The computing device of claim 7, wherein the set of one or more road links is selected based on road width or changes in direction to the satellite-based position measurement.

9. The computing device of claim 7, wherein calculating a map-match based on the particle filter solution further comprises:
   determining a ratio of a highest to a second highest relative likelihood values;
   determining that the ratio exceeds a threshold; and
   responsive to the determining, generating an instantaneous map-match solution.

10. The computing device of claim 7, wherein the score is determined from a multivariate normal distribution given by $$p(z_k | x_j) = \frac{1}{\sqrt{(2\pi)^n |R_k|}} e^{-\frac{1}{2}(z_k - x_j)^T R_k^{-1}(z_k - x_j)},$$

and where $p(z_k|x_j)$ is a probability of measurements $x_j$ given a specific road link point, n is a number of satellite-based measurements, $z_k$ is a vector of measurements for a $k^{th}$ epoch and $R_k$ is a measurement covariance matrix.

11. The computing device of claim 10, wherein the relative likelihood value for a jth particle $w_j$ is given by $$w_j = \frac{p(z_k | x_j)}{\sum_{i=1}^{N} p(z_k | x_j)},$$

and where N is a positive integer equal to the number of particles.

12. The computing device of claim 7, wherein propagating the particles along the road further comprises:
   determining a motion context from a sensor of the computing device;
   determining a process noise value based on the motion context; and
   propagating the particles along the road links and across intersections using the process noise value.

13. A non-transitory, computer-readable storage medium having instructions stored thereon, which, when executed by one or more processors of a computing device, cause the one or more processors to perform operations comprising:
   initializing a particle filter of the computing device using a first set of state measurements, the initializing including selecting a first set of particles based at least in part on a satellite-based position measurement;
   assigning each particle in the first set of particles to a road link of a road network based on a distance of the road link from the satellite-based position measurement and an uncertainty in the satellite-based position measurement;
   propagating the particles along their respective road links;
   calculating a second set of state measurements for the propagated particles;
   calculating a particle weight for each propagated particle based on the second set of state measurements;
   resampling the particles, the resampling including selecting a subset of the set of particles based on the particle weights;
   computing a particle filter solution based on a union of particles in the subset of particles that were propagated along two or more road links; and
   calculating, by the computing device, a map-match based on the particle filter solution to determine a location and direction of the computing device.

14. The computer-readable storage medium of claim 13, wherein the set of one or more road links is selected based on road width or changes in direction to the satellite-based position measurement.

15. The computer-readable storage medium of claim 13, wherein calculating a map-match based on the particle filter solution further comprises:
   determining a ratio of a highest to a second highest relative likelihood values;
   determining that the ratio exceeds a threshold; and
   responsive to the determining, generating an instantaneous map-match solution.

* * * * *